(12) United States Patent
Mukherjee et al.

(10) Patent No.: US 11,887,591 B2
(45) Date of Patent: Jan. 30, 2024

(54) METHODS AND SYSTEMS FOR ENABLING A DIGITAL ASSISTANT TO GENERATE AN AMBIENT AWARE RESPONSE

(71) Applicant: SAMSUNG ELECTRONICS CO., LTD., Gyeonggi-do (KR)

(72) Inventors: Siddhartha Mukherjee, Bangalore (IN); Udit Bhargava, Bangalore (IN)

(73) Assignee: Samsung Electronics Co., Ltd

( * ) Notice: Subject to any disclaimer, the term of this patent is extended or adjusted under 35 U.S.C. 154(b) by 473 days.

(21) Appl. No.: 17/255,195

(22) PCT Filed: Jun. 24, 2019

(86) PCT No.: PCT/KR2019/007605
§ 371 (c)(1),
(2) Date: Dec. 22, 2020

(87) PCT Pub. No.: WO2020/004881
PCT Pub. Date: Jan. 2, 2020

(65) Prior Publication Data
US 2021/0287675 A1 Sep. 16, 2021

(30) Foreign Application Priority Data

Jun. 25, 2018 (IN) .............................. 201841023569
Mar. 14, 2019 (IN) .............................. 201841023569

(51) Int. Cl.
*G06F 3/16* (2006.01)
*G10L 15/22* (2006.01)
(Continued)

(52) U.S. Cl.
CPC .............. *G10L 15/22* (2013.01); *G10L 25/63* (2013.01); *G10L 25/84* (2013.01); *G10L 2015/223* (2013.01)

(58) Field of Classification Search
None
See application file for complete search history.

(56) References Cited

U.S. PATENT DOCUMENTS 8,705,705 B2    4/2014    Thenthiruperai et al.
9,947,333 B1    4/2018    David
(Continued)

FOREIGN PATENT DOCUMENTS

CN    101778154    7/2010
CN    103024177    4/2013
(Continued)

OTHER PUBLICATIONS

Chinese Office Action dated Sep. 16, 2021 issued in counterpart application No. 201980032367.2, 16 pages.
(Continued)

*Primary Examiner* — Seong-Ah A Shin
(74) *Attorney, Agent, or Firm* — The Farrell Law Firm, P.C.

(57) ABSTRACT

Embodiments herein disclose methods and systems for providing a digital assistant in a device, which can generate responses to commands from a user based on ambience of the user. On receiving a command from the user of the device to perform an action, content stored in the device can be extracted. The embodiments include determining degree of privacy and sensitivity of the content. The embodiments include determining ambience of the user based on ambient noise, location of the device, presence of other humans, emotional state of the user, application parameters, user activity, and so on. The embodiments include generating a response and revealing the response based on the determined ambience and the degree of privacy and sensitivity of the extracted content. The embodiments include facilitating
(Continued)

dialog with the user for generating appropriate responses based on the ambience of the user.

7 Claims, 4 Drawing Sheets

(51) Int. Cl.
  *G10L 25/63* (2013.01)
  *G10L 25/84* (2013.01)

(56) References Cited

U.S. PATENT DOCUMENTS

| | | | |
|---|---|---|---|
| 9,953,088 | B2 | 4/2018 | Gruber et al. |
| 10,127,224 | B2 | 11/2018 | Deleeuw |
| 10,587,430 | B1* | 3/2020 | Smith ................ H04N 21/4825 |
| 10,909,582 | B1* | 2/2021 | Brandt ............... G06Q 20/4014 |
| 11,562,744 | B1* | 1/2023 | Gao ......................... G10L 15/26 |
| 11,636,855 | B2* | 4/2023 | Taylor ..................... G10L 25/84 |
| | | | 704/275 |
| 2008/0300700 | A1 | 12/2008 | Hammer et al. |
| 2011/0151852 | A1 | 6/2011 | Olincy et al. |
| 2011/0207449 | A1 | 8/2011 | Shin et al. |
| 2012/0245937 | A1 | 9/2012 | Thenthiruperan et al. |
| 2014/0316853 | A1 | 10/2014 | Lyren |
| 2016/0174074 | A1 | 6/2016 | Kim et al. |
| 2016/0261532 | A1 | 9/2016 | Garbin et al. |
| 2016/0373571 | A1 | 12/2016 | Woolsey et al. |
| 2018/0139587 | A1 | 5/2018 | Yang |
| 2018/0323991 | A1* | 11/2018 | Segal ...................... G10L 15/26 |
| 2018/0330069 | A1* | 11/2018 | Quinn ..................... G10L 15/22 |
| 2019/0013025 | A1* | 1/2019 | Alcorn .................... G10L 15/22 |
| 2019/0058679 | A1* | 2/2019 | Garbin ................... H04W 12/02 |
| 2019/0073998 | A1* | 3/2019 | Leblang ................. G10L 15/30 |
| 2019/0141190 | A1* | 5/2019 | Gupta ..................... G10L 25/63 |
| 2020/0098358 | A1* | 3/2020 | Rakshit ................. G06F 16/243 |
| 2020/0258535 | A1* | 8/2020 | Vatanparvar ............ G10L 15/22 |
| 2020/0410980 | A1* | 12/2020 | Yamada .................. G06F 3/167 |

FOREIGN PATENT DOCUMENTS

| | | |
|---|---|---|
| CN | 105763698 | 7/2016 |
| CN | 105939333 | 9/2016 |
| CN | 106303015 | 1/2017 |
| CN | 106790930 | 5/2017 |
| EP | 3 065 434 | 9/2016 |
| KR | 102016007111 | 6/2016 |
| WO | WO2017044257 | 3/2017 |

OTHER PUBLICATIONS

Chinese Office Action dated Feb. 25, 2021 issued in counterpart application No. 201980032367.2, 16 pages.
European Search Report dated Mar. 30, 2021 issued in counterpart application No. 19825698.4-1216, 10 pages.
Chinese Office Action dated Dec. 21, 2021 issued in counterpart application No. 201980032367.2, 21 pages.
PCT/ISA/210 Search Report issued on PCT/KR2019/007605, dated Oct. 2, 2019, pp. 3.
PCT/ISA/237 Written Opinion issued on PCT/KR2019/007605, dated Oct. 2, 2019, pp. 5.
Ondrej Dusek et al., "A Context-aware Natural Language Generator for Dialogue Systems", Proceedings of the SIGDIAL 2016 Conference, pp. 185-190, Los Angeles, USA, Jan. 1, 2016, pp. 6.
Farah Benamara, "Cooperative Question Answering in Restricted Domains: the WEBCOOP Experiment", Jan. 1, 2004, pp. 8.
Sabastian Varges et al., "Instance-based natural language generation", Jan. 1, 2001, pp. 8.
Wikipedia, "Natural-language generation", Aug. 7, 2020, pp. 6.
Iryna Gurevych et al., "Natural Language Processing for Ambient Intelligence", Jan. 1, 2007, pp. 7.
Kees van Deemter, "Real vs. template-based natural language generation: a false opposition?", Jan. 1, 2005, pp. 8.

* cited by examiner

[Fig. 1a]
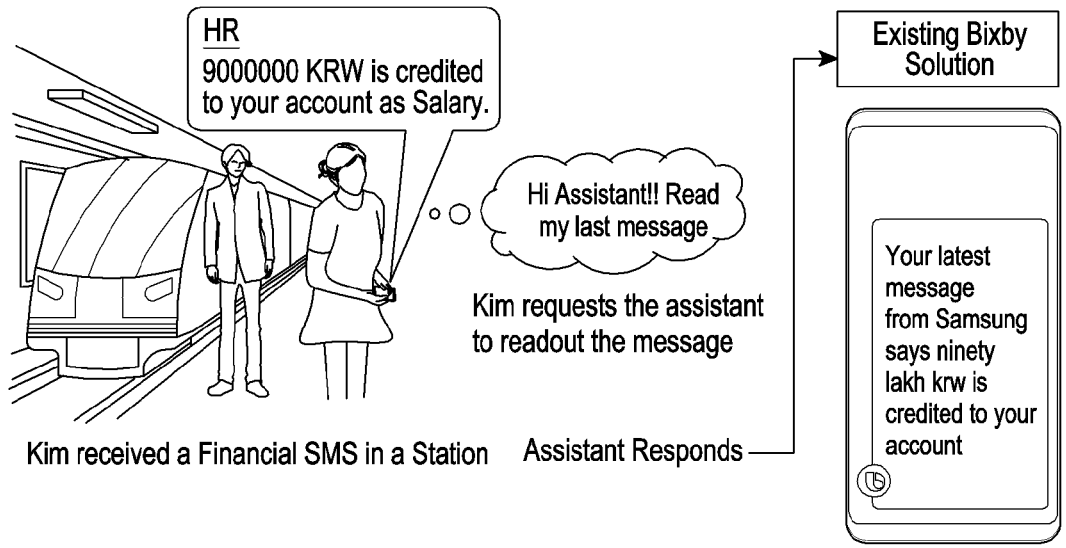
[Fig. 1b]
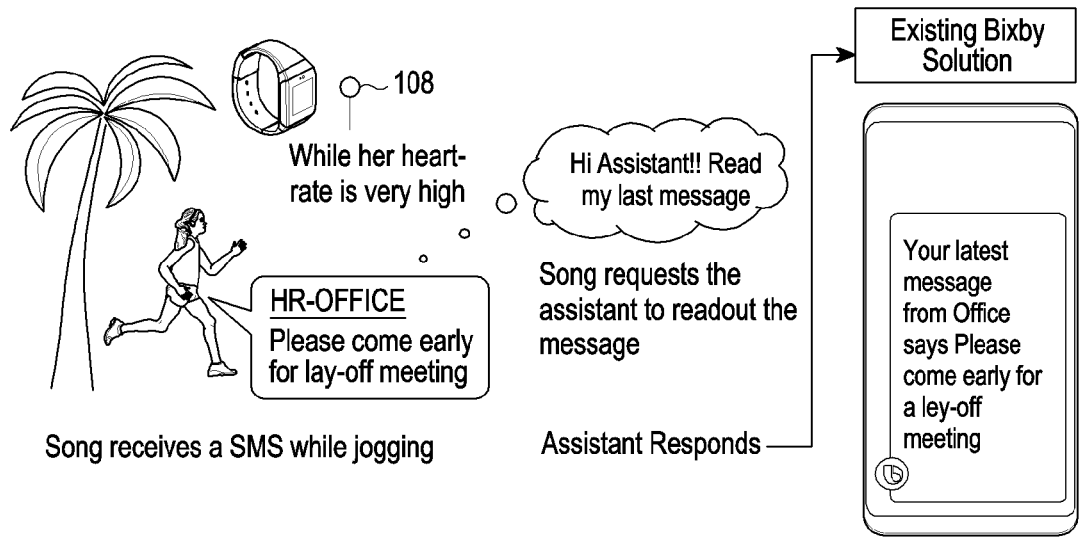

[Fig. 2]
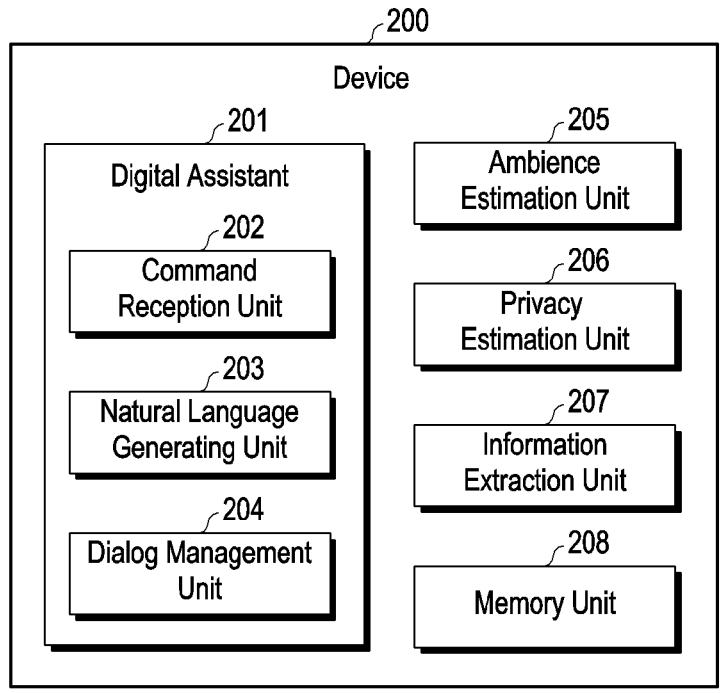
[Fig. 3]
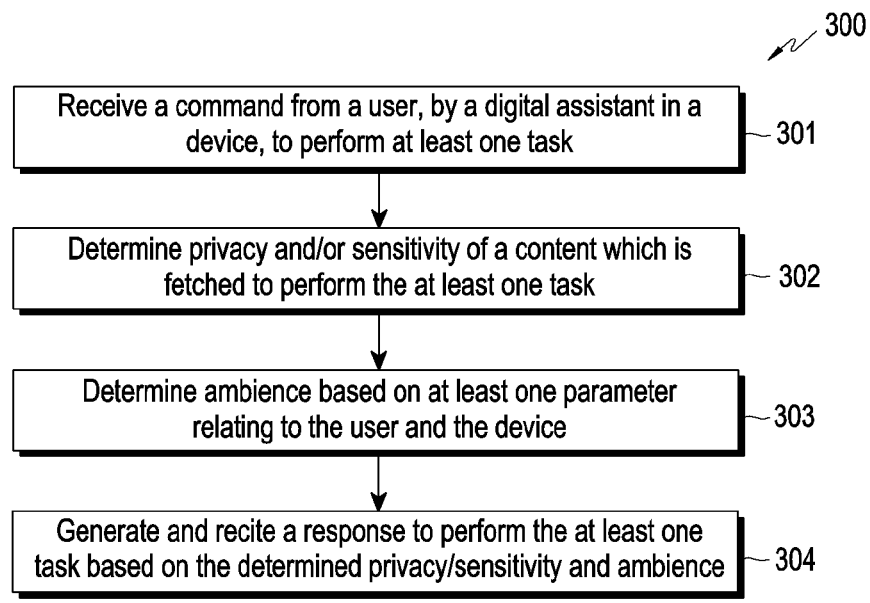

[Fig. 4]
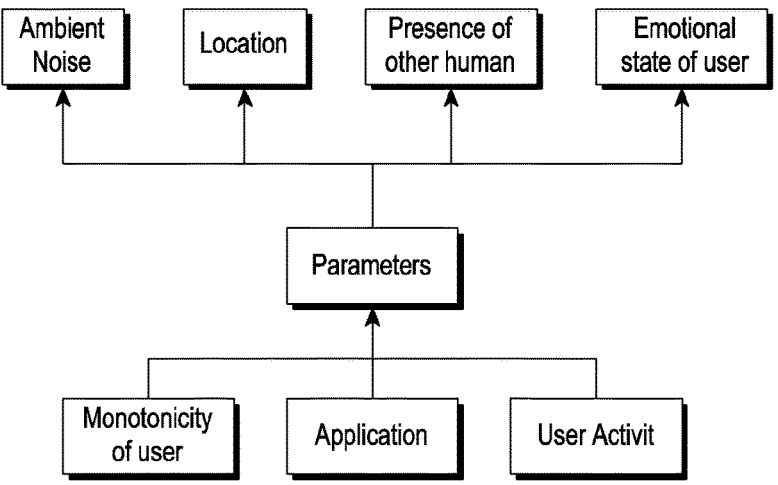
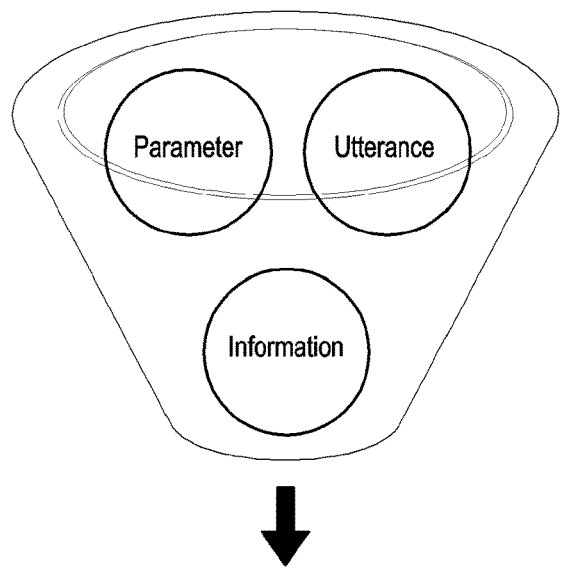
Ambient aware natural language generation
[Fig. 5a]
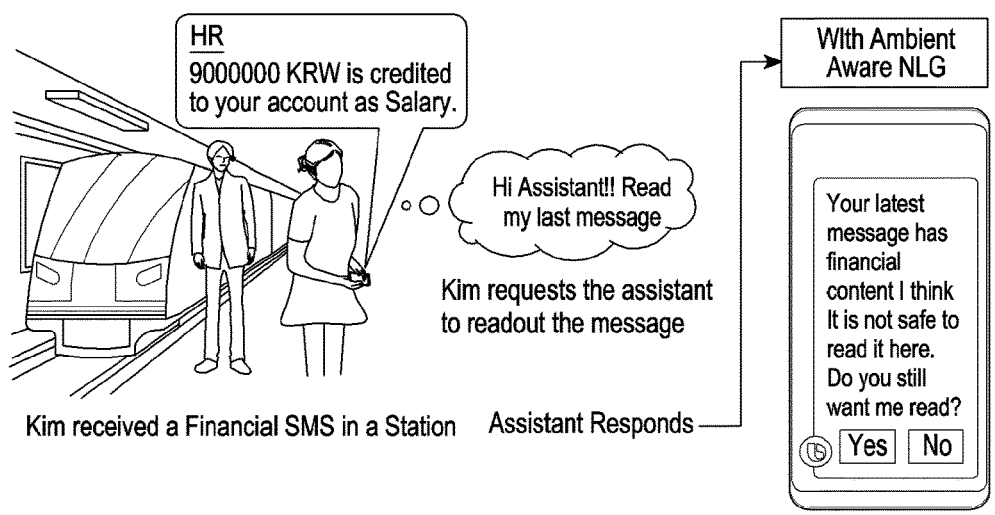
Kim received a Financial SMS in a Station   Assistant Responds

[Fig. 5b]
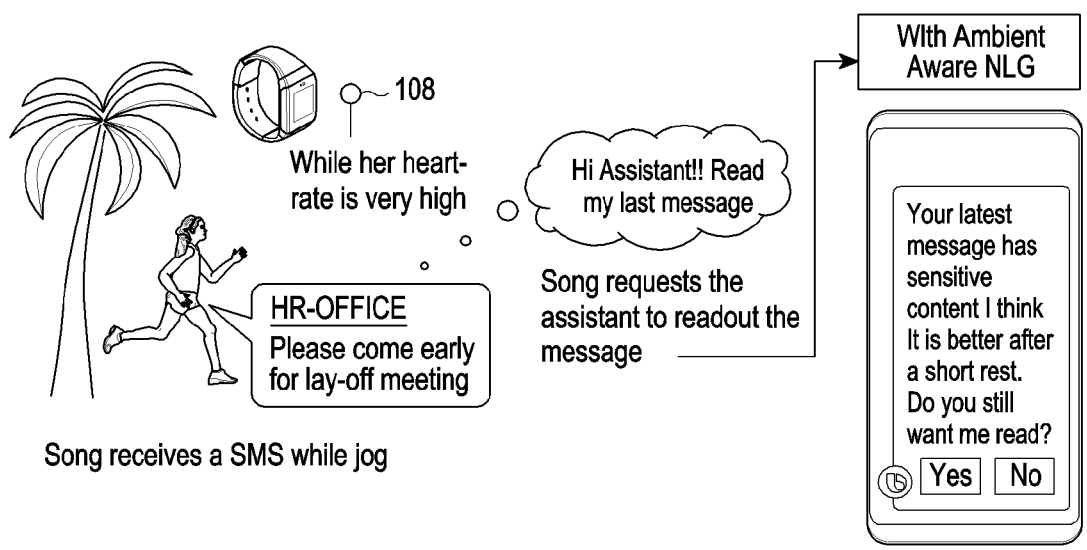

METHODS AND SYSTEMS FOR ENABLING A DIGITAL ASSISTANT TO GENERATE AN AMBIENT AWARE RESPONSE

PRIORITY

This application is a National Phase Entry of PCT International Application No. PCT/KR2019/007605, which was filed on Jun. 24, 2019, and claims priority to Indian Provisional Patent Application No. 201841023569 (PS) and Indian Complete Patent Application No. 201841023569 (CS), which were filed on Jun. 25, 2018 and Mar. 14, 2019, respectively, the contents of each of which are incorporated herein by reference.

TECHNICAL FIELD

Embodiments herein relate to digital assistant solutions, and more particularly to methods and systems for enabling a digital assistant to generate ambient aware responses.

BACKGROUND ART

Currently, digital assistants, such as a voice assistant, can utilize Artificial Intelligence (AI), which allows users to perform a variety of tasks such as creating alarms, sending and receiving messages, making and receiving phone calls, answering questions, controlling devices, and so on; through voice commands. When a user assigns a voice assistant to perform a particular task, a response is provided to the user through a natural dialog, which can be generated using a Natural Language Generation (NLG) system. Currently, the response from the NLG system may not consider the ambience of the user, content of information, and degree of privacy and sensitivity in the information content.

FIGS. 1a and 1b depict example scenarios, wherein a user is likely to have an undesirable experience due to recitation of responses from a voice assistant system. As depicted in FIG. 1a, consider that the user is in a public space. The user can possess a device capable of receiving messages and equipped with a voice assistant. Consider that the user receives a sensitive message. The user may direct the voice assistant to read the message. The voice assistant can extract information, i.e., fetch the message. The NLG system in the voice assistant can be used for generating a response. As the content of the message is sensitive, recitation of the response in the public space can be a source of embarrassment to the user.

As depicted in FIG. 1B, consider that the user is performing an activity involving physical exertion. The smart device, equipped with the voice assistant, receives a message, which requires considerable deliberation. The user unaware of the content of the message may direct the voice assistant to read the message. The message can be extracted and the NLG system can generate a response, which comprises of the message in audible form. The message can be recited without any consideration of the physical and mental state of the user. The user may be displeased by the recitation of the message.

DISCLOSURE OF INVENTION

Technical Problem

An aspect of the present disclosure is to disclose methods and systems for providing a digital assistant in a device, which can generate responses to commands from a user based on privacy and/or sensitivity of content and current ambience.

Another aspect of the present disclosure is to determine the current ambience based on at least one parameter relating to the device and the user of the device.

Another aspect of the present disclosure is to determine degree of privacy or sensitivity of the extracted content.

Another aspect of the present disclosure is to enable the user to engage in a dialog with the device, wherein the dialog involves receiving inputs from the user, wherein the received inputs can aid in generation and revelation of appropriate responses.

Solution to Problem

In accordance with an aspect of the present disclosure, a method for providing a digital assistant in a device which can generate ambient aware responses to execute user commands. The method further includes extracting a content to execute a received command. The command can be received on occurrence of an event. The method further includes determining at least one of privacy of the content and sensitivity of the content. The method further includes determining ambience based on parameters relating to the device and user of the device. The method further includes generating a response based on the privacy of the content, the sensitivity of the content and the ambience. The method further includes revealing the generated response based on the privacy of the content, the sensitivity of the content and the ambience.

These and other aspects of the present disclosure will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This disclosure is illustrated in the accompanying drawings, through out which like reference letters indicate corresponding parts in the various figures. The embodiments herein will be better understood from the following description with reference to the drawings, in which:

FIGS. 1a and 1b depict example scenarios, wherein a user is likely to have an undesirable experience due to recitation of responses from a voice assistant system;

FIG. 2 depicts various units of a device comprising of a digital assistant that can generate a natural language response based on ambience, according to an embodiment of the disclosure.

FIG. 3 is a flowchart depicting a method for generating, by the digital assistant, an ambient aware response to a command from a user, according to an embodiment of the disclosure;

FIG. 4 depicts example parameters related to the user and the device, based on which the ambience can be determined, according to an embodiment of the disclosure; and FIGS. 5a and 5b depict example scenarios, wherein ambient aware response is generated and revealed in order to execute a voice command, according to an embodiment of the disclosure.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for providing a digital assistant in a device, which can generate intelligent responses to commands from a user based on privacy and/or sensitivity of content, and ambience. The content can be a SMS, an instant message, an e-mail, a media file, and so on. The embodiments include receiving a command from the user of the device to perform to perform at least one task. The command can be received on occurrence of an event such as receiving a phone call, message, notification, and so on. The execution of the command may require fetching or extracting the content. The embodiments include determining degree of privacy and/or sensitivity of the content. The embodiments include determining ambience of the user based on ambient noise, location of the device, presence of other humans, emotional state of the user, application parameters, user activity, and so on. The embodiments include generating a response and revealing the response based on the determined ambience and the degree of information privacy and/or sensitivity of the extracted content. The embodiments include facilitating interactions with the user for generating appropriate responses based on the privacy and/or sensitivity of the extracted content and the ambience.

Referring now to the drawings, and more particularly to FIGS. 2 through 5b, where similar reference characters denote corresponding features consistently throughout the figures, there are shown preferred embodiments.

FIG. 2 depicts various units of a device 200 comprising of at least one processor that can generate a natural language response based on ambience, according to embodiments as disclosed herein. The device 200 can be a smart phone, laptop, wearable device, Internet of Things (IoT) device, and so on. The device 200 can include a digital assistant 201, an ambience estimation unit 205, a privacy estimation unit 206, an information extraction unit 207, and a memory unit 208. The digital assistant 201 can include a command reception unit 202, a natural language generating unit 203 and a dialog management unit 204.

In an embodiment, the digital assistant 201 can include the ambience estimation unit 205, the privacy estimation unit 206, and the information extraction unit 207.

The digital assistant 201 can receive command(s) from a user through the command reception unit 202 to perform tasks. In an embodiment herein, the command(s) can be received from a user on occurrence of an event. In an embodiment herein, the command(s) can be received to instruct the digital assistant 201 to perform a task. The command can be received from the user through either text or voice, or from another device through Bluetooth or Internet, and so on.

In an example, consider that the digital assistant 201 receives a voice command to perform a task. Once the voice command is received, the information extraction unit 207 can extract or fetch necessary information content, which may be required to execute the command. The content can be fetched from the memory unit 208, Internet, server, cloud, and so on. Once the content is extracted, the privacy estimation unit 206 can estimate the privacy and/or sensitivity of the content. The content stored in the memory unit 208 can be received from an external device.

The ambience estimation unit 205 can determine parameters relating to the user and the device 200, based on which the ambience is estimated. The parameters include, but are not limited to, noise in the vicinity of the device 200, location of the device 200, presence of other humans in the vicinity of the user/device 200, emotional state of the user, detected monotonicity of the user, user activity, and applications installed in the device 200.

The natural language generating unit 203 can generate a response based on the determined privacy and/or sensitivity of the extracted information content and the ambience. The natural language generating unit 203 can be a part of a natural language processing unit. The generated response can be, thereafter, revealed to the user. The generated response can be displayed and/or revealed. The dialog management unit 204 enables a user to interact or engage in a dialog with the digital assistant such that an appropriate response, based on the determined privacy and/or sensitivity of the extracted information content and ambience, is generated and revealed by the natural language generating unit 203.

FIG. 2 shows exemplary units of the device 200, but it is to be understood that other embodiments are not limited thereon. In other embodiments, the device 200 may include less or more number of units. Further, the labels or names of the units are used only for illustrative purpose and does not limit the scope of the invention. One or more units can be combined together to perform same or substantially similar function in the device 200.

FIG. 3 is a flowchart 300 depicting a method for generating, by the digital assistant 201, an ambient aware response to a command from a user, according to embodiments as disclosed herein. At step 301, the method includes receiving a command from the user to perform at least one task. The command can be received on occurrence of an event. In an example, consider that the digital assistant 201 receives a voice command from the user to read a recently received message.

At step 302, the method includes determining the privacy and/or sensitivity of a content, fetched in order to perform the at least one task. Considering the example, the method includes fetching the received message from the messaging application. Once the message is fetched, the method includes examining the content of the message in order to determine the degree of privacy and/or sensitivity of the message.

The privacy and/or sensitivity of the content can be determined based on an understanding of the content, the sender of the content, type of information comprising the content, and so on. In an example, if the content is a message, then the understanding can include understanding the sentiments involved in composing the message content. The embodiments include understanding whether the message content includes financial information, and so on. In an example, the type can be audio, video, and so on.

At step 303, the method includes determining the ambience based on at least one parameter related to the user or the device 200. Considering the example, the method includes determining parameters such as noise in the vicinity of the device 200, location of the device 200, presence of other humans in the vicinity of the user/device 200, emotional state of the user, detected monotonicity of the user, user activity, and applications installed in the device 200, and so on. The parameters can be determined by an artificial intelligence system or a rule based system.

At step 304, the method includes generating and, thereafter, revealing a response to perform the at least one task or execute the command. Considering the example, the received message can include private and/or sensitive information that is to be kept confidential. Further, consider that the user is currently located in a public space. If a response message is generated and recited without consideration of privacy and/or sensitivity of the message content, and the ambience, the user experience is not likely to be favorable. On the other hand, if the privacy, sensitivity of the message content, and the ambience is considered; then a response message can be generated, which can either raise an alert or warn the user indicating the private and sensitive nature of the message content.

The method further includes enabling the user to interact or engage in a dialog with the digital assistant 201 in order to generate appropriate responses. Considering the example, initially the response message can inform the user that the content of the received message is sensitive. The dialog can provide options to the user by which the user can select whether the user still wants the received message to be recited in the public space.

The various actions in method 300 may be performed in the order presented, in a different order or simultaneously. Further, in various embodiments, some actions listed in FIG. 3 may be omitted.

FIG. 4 depicts example parameters related to the user and the device 200, based on which the ambience can be determined, according to embodiments as disclosed herein. The determination of ambience can allow an ambient aware natural language generation. The ambient aware natural language generation leads to revelation of responses to commands which can be appropriate, considering the sensitivity and privacy of the content, to be fetched in order to perform a task. As depicted in FIG. 4, the parameters can be ambient noise, location, presence of human, emotional state of user, monotonicity of user, application, and user activity. The embodiments include determining the ambience based on at least one of these parameters. It is to be understood that there can be additional parameters by which the ambience can be determined.

The ambient noise parameter can refer to the environment in which the user is situated. For example, in an outdoor environment such as shopping mall, railway station, road, meeting, and so on, the ambient noise can be high. On the other hand, in an indoor environment such as home, or personal cabin, the ambient noise can be low. Similarly, the presence of other human in the outdoor environment is likely to be high, whereas in the indoor environment it is likely to be low.

The location parameter can specify the location of the user and concomitantly the device 200. It can also indicate whether the device 200 is stationary or in a moving condition (the user in a vehicle). The emotional state of the user refers to the psychological condition of the user. Based on this parameter, the embodiments can determine whether a response can be revealed to the user.

The monotonicity of the user can indicate whether the user experience of the revealed responses are tedious, dull, lack in variety and interest, and so on. The embodiments can determine the monotonicity of the user based on the emotional state of the user or the user expressions, when the response is revealed.

The embodiments can determine the ambience of the user from information stored in an application. In an example, the embodiments can determine from the calendar application, if the user is in a meeting, attending an event, in a hotel, and so on.

The embodiments can determine the activity in which the user is currently engaged in. In an example, the embodiments can determine whether the user is engaged in cycling, jogging, resting, and so on. Based on the current activity, the emotional state can be determined as well.

FIGS. 5a and 5b depict example scenarios, wherein ambient aware response is generated and revealed in order to execute a voice command, according to embodiments as disclosed herein. As depicted in FIG. 5a, consider that the user 'Kim' is in a public space. The user possesses the device 200, capable of receiving messages, and equipped with the digital assistant 201. Consider that the user receives a sensitive message which includes finance related information. The user, unaware of the content of the message, may direct the digital assistant 201 to read the message.

The information in the message can be extracted and examined to determine the privacy and/or sensitivity of the message. The parameters relating to the user and the device 200 can be determined to estimate the ambience. Based on the determined privacy and/or sensitivity of the message, and ambience, a response can be generated and/or a dialog can be initiated with the user. The generated response can warn the user that the received message includes financial content which can be sensitive considering the ambience, which is a public space. The dialog can involve generating a response, which would require the user to respond by confirming whether the message is to be revealed. The generated message can be, thereafter, revealed. When the message from the digital assistant 201 is revealed, the user is alerted about its content. The user is facilitated to engage in a dialog with the digital assistant 201 as to whether the user would prefer to still read the message (Yes) or not (Not). Based on the response of the user, the digital assistant 201 may recite the message or refrain. The user experience can be thus improved.

As depicted in FIG. 5b, consider that the user 'Song' is performing an activity involving physical exertion. The user possesses the device 200, capable of receiving messages, and equipped with the digital assistant 201. Consider that the received message requires considerable deliberation. The user unaware of the content of the message may direct the digital assistant 201 to read the message.

The information in the message can be extracted and examined to determine the privacy and/or sensitivity of the message. The parameters relating to the user and the device 200 can be determined to estimate the ambience. Based on the determined privacy and/or sensitivity of the message, and ambience, a response can be generated. The generated response can warn the user that the received message includes sensitive content considering the ambience, wherein the user is performing a physical activity. The generated message can be, thereafter, revealed. When the message from the digital assistant 201 is revealed, the user is alerted about its content. The generated message can be revealed by displaying and/or reciting. The user is facilitated to engage in a dialog with the digital assistant 201 as to whether the user would prefer to still read the message (Yes) or not (No). Based on the response of the user, the digital assistant 201 may recite the message or refrain. The user experience can be thus improved.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein describe methods and systems for providing a digital assistant capable of providing an ambient aware response on receiving a voice command from a user. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs and GPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for providing an ambient aware response by a device,
the method comprising:
  receiving a first user command to output a received message;
  identifying message content related to at least one task corresponding to the first user command;
  determining privacy of the message content based on whether the message content includes financial information;
  determining ambience based on at least one parameter relating to the device and a user of the device, wherein the at least one parameter includes a first parameter indicating a position of the device and a second parameter indicating whether the user is in a vehicle;
  determining an emotional state of the user;
  outputting a dialog message for inquiring about whether to output the received message based on the determined privacy of the message content, the determined ambience, and the emotional state of the user;
  receiving a second user command about whether to output the received message as a response to the dialog message; and
  outputting the received message or refraining from outputting the received message according to the second user command.

2. The method of claim 1, wherein the privacy of the message content is determined based on at least one of monitory figures in the content, personal contacts, and credentials.

3. The method of claim 1, wherein the first user command is received, on occurrence of an event, wherein the first user command is received from at least one user of the device in one of text format or voice format, and another device.

4. The method of claim 1, wherein the at least one parameter further comprises at least one of noise in the vicinity of the device, presence of humans in the vicinity of the device, activity of the user of the device, or applications installed in the device.

5. A device for providing an ambient aware response, the device configured to:
  a digital assistant configured to receive a first user command to output a received message; and
  at least one processor operatively connected to the digital assistant, wherein the at least one processor configured to:
  identify message content related to at least one task corresponding to the first user command;
  determine privacy of the message content;
  determine ambience based on at least one parameter relating to the device and a user of the device, wherein the at least one parameter includes a first parameter indicating a position of the device and a second parameter indicating whether the user is in a vehicle;
  determine an emotional state of the user;
  output a dialog message for inquiring about whether to output the received message based on the determined privacy of the message content, the determined ambience, and the emotional state of the user;
  receive a second user command about whether to output the received message as a response to the dialog message; and
  output the received message or refraining from outputting the received message according to the second user command.

6. The device of claim 5, wherein the privacy or the sensitivity of the message content is determined based on at least one of monitory figures in the content, personal contacts, and credentials.

7. The device of claim 5, wherein the first user command is received, on occurrence of an event, wherein the first user command is received from at least one user of the device in one of text format or voice format, and another device.

* * * * *